United States Patent

Callaghan

[15] 3,683,391

[45] Aug. 8, 1972

[54] ANTENNA SYSTEM FOR TELEVISION RECEPTION WITHIN BOTH THE UHF AND VHF TELEVISION BAND OF FREQUENCIES

[72] Inventor: John D. Callaghan, Cherry Hill, N.J.

[73] Assignee: RCA Corporation, New York, N.Y.

[22] Filed: Oct. 19, 1970

[21] Appl. No.: 82,216

Related U.S. Application Data

[63] Continuation of Ser. No. 708,231, Feb. 26, 1968, abandoned.

[52] U.S. Cl. .................343/802, 343/815, 343/816, 343/819

[51] Int. Cl.......H01q 5/02, H01q 15/18, H01q 21/30

[58] Field of Search.............................343/815, 819

[56] References Cited

UNITED STATES PATENTS

| | | | |
|---|---|---|---|
| 2,714,659 | 8/1955 | Johnson et al. | 343/818 X |
| 3,163,864 | 12/1964 | Greenberg | 343/751 X |
| 3,321,764 | 5/1967 | Winegard et al. | 343/819 X |
| 3,392,399 | 7/1968 | Winegard | 343/819 X |
| 3,454,950 | 8/1969 | Grant et al. | 343/751 |

FOREIGN PATENTS OR APPLICATIONS

| | | | |
|---|---|---|---|
| 1,359,018 | 3/1964 | France | 343/817 |
| 751,249 | 6/1956 | Great Britain | 343/818 |
| 975,482 | 11/1964 | Great Britain | 343/815 |

*Primary Examiner*—Herman Karl Saalbach
*Assistant Examiner*—Wm. H. Punter
*Attorney*—Edward J. Norton

[57] ABSTRACT

An antenna system operable within both the UHF television band of frequencies and the VHF television band of frequencies is provided wherein a structure which acts as a sheet type, broadband, non-resonant reflector at UHF frequencies is spaced between a UHF driven element and the VHF driven dipole elements. The structure is constructed, for example, of parallel rods or conductors with a support member joining the rods to form a grid like construction approximating a sheet reflector. The parallel rods are of such length and are so arranged relative to said VHF driven elements to act also as a resonant director for frequencies at the high end of the VHF television band of frequencies.

3 Claims, 2 Drawing Figures

INVENTOR
JOHN D. CALLAGHAN
BY Edward J. Norton
ATTORNEY

INVENTOR
JOHN D. CALLAGHAN
BY Edward J. Norton
ATTORNEY

ANTENNA SYSTEM FOR TELEVISION RECEPTION WITHIN BOTH THE UHF AND VHF TELEVISION BAND OF FREQUENCIES

This is a continuation of my copending application Ser. No. 708,231, filed Feb. 26, 1968, and now abandoned.

BACKGROUND OF INVENTION

This invention relates to a multi-frequency antenna and more specifically to an improved antenna for television reception within both the UHF and VHF television bands.

Television reception antennas which operate within the very-high frequency (VHF) and ultra-high frequency (UHF) band of frequencies are well known in the state of the art. Due to the increasing number of UHF television stations, there has been an increased demand for television antenna systems which operate over both UHF and VHF television bands of frequencies. There is likewise a demand to provide a television antenna having increased response or gain over both the UHF and VHF television frequencies in order that relatively weak signals received from the transmitters may be effectively received.

It is an object of the present invention to provide an improved antenna suitable for television reception over both the UHF and VHF range of frequencies and characterized by a structure which acts as a sheet reflector for all frequencies within the UHF band of frequencies and as a director at the high end of the VHF band of frequencies.

SUMMARY OF THE INVENTION

In accordance with the present invention, these objectives are achieved by the use of a structure coupled between at least one driven element operable as a pickup device for frequencies within one band of frequencies and at least one second driven element operable as a pickup element in a lower frequency band. The structure spaced between these elements is so dimensioned and arranged that it acts as a non-resonant sheet reflector for frequencies within the one band of frequencies and as a director for frequencies of the lower band.

DESCRIPTION OF THE PREFERRED EMBODIMENT OF THE INVENTION

Figure 1:
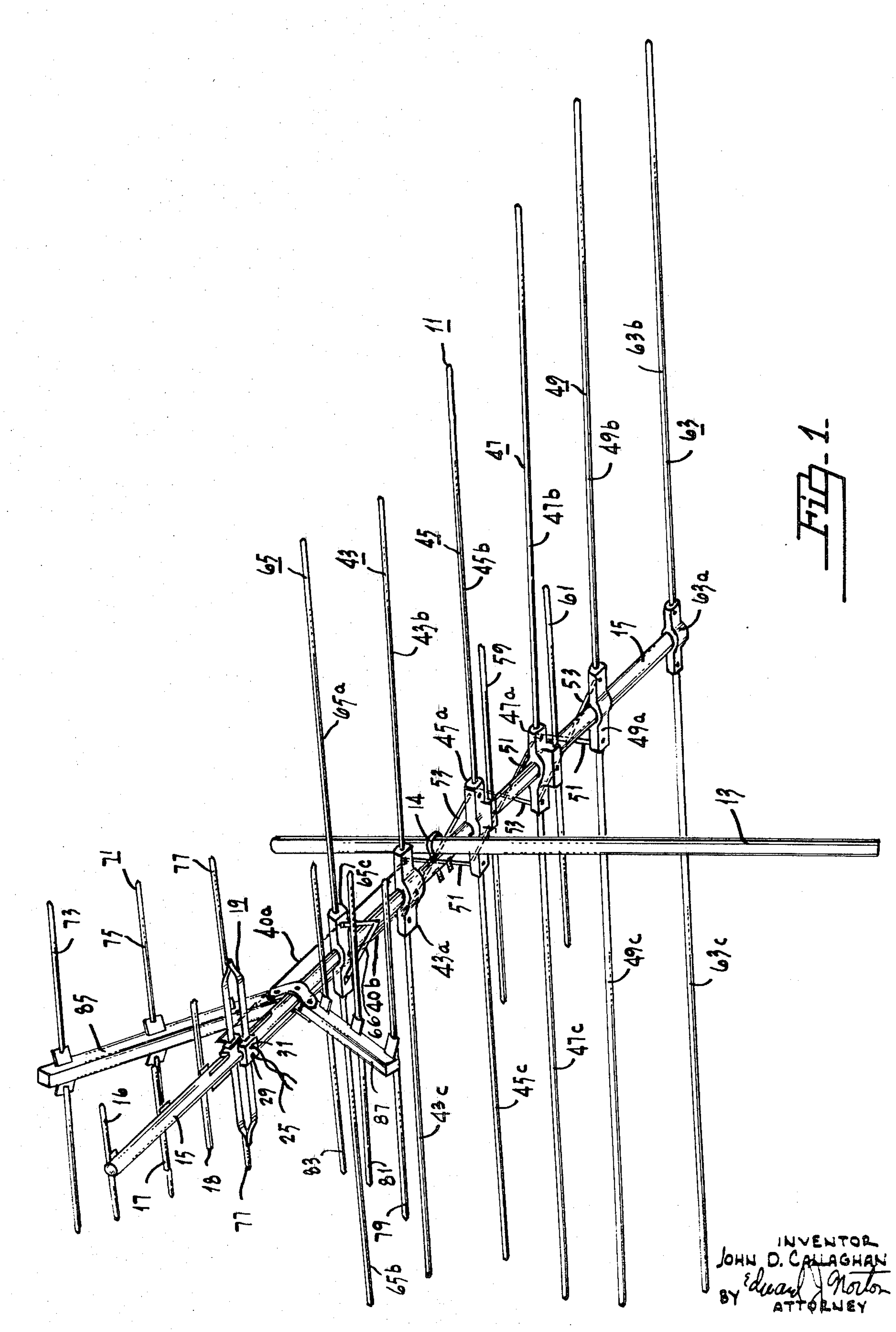
Figure 2:
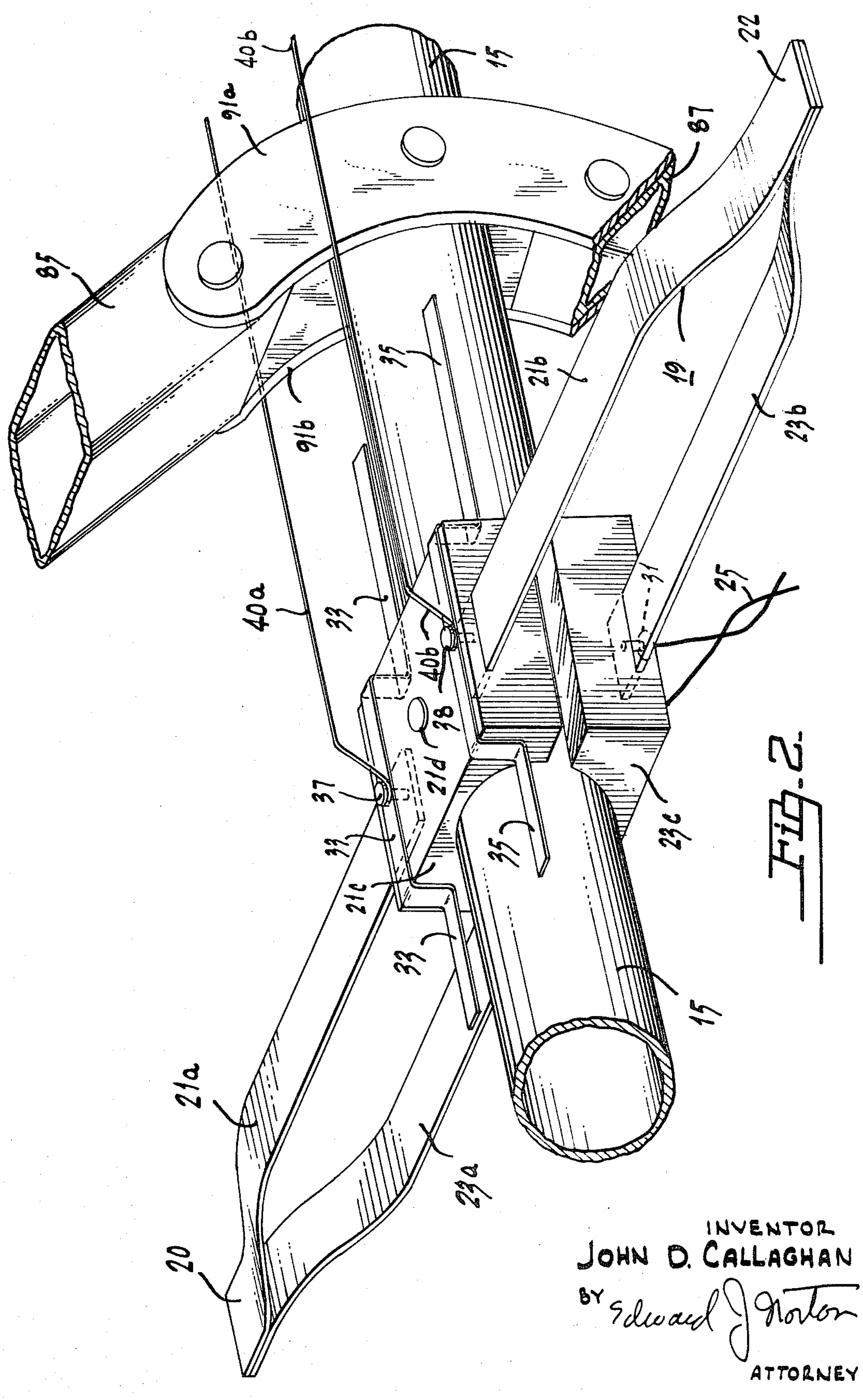

A more detailed description follows in conjunction with the following illustration in which:

FIG. 1 is a perspective view of a television antenna constructed in accordance with the present invention, FIG. 2 is an enlarged fragmentary view of the folded dipole and the adjacent portions shown in FIG. 1.

Referring now to the drawing of FIGS. 1 and 2, the antenna 11 is supported by a mounting mast 13 which extends in a vertical direction and is in turn supported by a suitable means (not shown). A horizontal mounting bar 15 is fixed by suitable means such as a U-bolt clamp 14 to the top of mast 13. The U-bolt 14 which is received in the bar 15 is drawn tight to the bar by nuts (not shown). The front driven element 19 acts as a folded dipole made up of upper element 21 and lower element 23. The length between the connected end points 20 and 22 of the folded dipole 19 is approximately one-half a wavelength long within the desired UHF band of frequencies. FIG. 2 shows an enlarged fragmentary perspective view of the folded dipole 19. The upper element of the dipole 19 is split into portions 21*a* and 21*b* and the lower element is split into portions 23*a* and 23*b*. The mounting bar of insulator material 21*c* physically holds and spaces the upper element portions 21*a* and 21*b* and the mounting bar of insulator material 23*c* physically holds and spaces the lower element portions 23*a* and 23*b*. The mounting bars 21*c* and 23*c* are riveted to the mounting bar 15 by a first rivet 21*d* and a second rivet for bar 23*c*, not shown. The twin lead transmission line 25 from the receiver or other utilization means is coupled so one lead of line 25 connects to terminal 29 on mounting block 23*c* and the other lead of line 25 connects to terminal 31 on mounting block 23*c*, see FIG. 1. The lower element portion 23*a* is coupled to terminal 29 and the lower element 23*b* is coupled to terminal 31. The upper element portion 21*a* is connected to terminal point 37 on mounting block 21*c*, and the upper element portion 21*b* is connected to terminal point 38 on mounting block 21*c*. The conductive strips 33 and 35 are coupled respectively across the terminals 37 and 38. The portion of these conductive strips on one side of terminals 37 and 38 is made shorter than the conductive portion on the opposite side of the terminals 37 and 38. The conductive strips 33 and 35 are of such dimension and are so positioned relative to one another that the pair of conductive strips 33 and 35 act as one open circuit terminated one-quarter wavelength transmission line stub within one UHF television band on the one side of the terminals 37 and 38 and as another open circuit terminated one-quarter wavelength transmission line stub within another UHF television band on the other side of these terminals.

A second transmission line is made up of twin lead wires 40*a* and 40*b* connected respectively to terminals 37 and 38 at the top of the folded dipole 19. The twin lead wires 40*a* and 40*b* are connected in turn to inboard ends of arms 43*b* and 43*c* of the first VHF driven element 43. In the operation of the dipole 19, the upper and lower elements 21 and 23 act as elements of a folded dipole for UHF frequencies within the band selected by the stubs formed by conductors 33 and 35, and the upper and lower elements 21 and 23 act to couple the VHF frequencies between transmission line 25 and the driven element 43. Signals within the UHF bands selected act resistive across the conductive strips and are shunted by the conductive strips 33 and 35 due to their parallel relation and length to form a folded dipole. By shunting these signals within the UHF bands, these signals are isolated from the VHF driven elements. For VHF frequencies the one-quarter wavelength long stubs act reactive rather than resistive and therefore the VHF frequencies are not shunted but are coupled from the VHF driven elements. Many and varied other techniques may be used within the scope of this invention to feed both UHF and VHF driven elements and to provide isolation between the UHF and VHF dipole driven elements.

Parasitic directors 16, 17 and 18 are mounted forward of the folded dipole 19 on the mounting bar 15. Parasitic director 18 is divided into two director arms by an insulated mounting block and therefore acts as a plurality of directors. The length of these directors is made slightly less than one-half of a wavelength long within the UHF band of frequencies selected by the folded dipole. These directors are spaced forward of the folded dipole 19 and are dimensioned so as to act capacitively at the resonant frequency of the folded dipole 19. Four driven elements 43, 45, 47 and 49 are mounted along the mounting bar 15. These elements are in the form of simple dipoles and are aligned and coplanar with each other and are approximately coplanar with the folded dipole 19. Each of these dipoles is supported by an insulated mounting block of molded plastic being indicated as 43a, 45a, 47a and 49a. Each such mounting block is suitably fixed to the mounting bar 15 as by a rivet extending vertically through the mounting bar 15 and the mounting block to secure the two together. Each mounting block supports a pair of dipole arms such that each of the arms are insulated from each other and from the mounting bar 15. These dipole arms are indicated respectively as 43b and 43c, 45b and 45c, 47b and 47c and 49b and 49c as shown. The respective dipole arms preferably rest in a shallow channel or groove formed on the side of the corresponding mounting block and the arms are secured by a rivet extending through the respective dipole arm and mounting block coupling the two together. At the in-board ends of the arms near where the rivet affixes the arms to the mounting block is located a pair of dipole terminals for each pair of arms. The respective dipole arms receive the transmission line conductors 51 and 53 of these terminals. The conductors 51 and 53 cross between adjacent dipole units 43, 45, 47 and 49 permitting close spacing of these driven elements. The second transmission line made up of lead wires 40a and 40b is coupled respectively to terminals at the in-board ends of dipole arms 43b and 43c. Conductors 51 and 53 are connected respectively to the terminals at the in-board ends of dipole arms 43b and 43c. The lengths of the feed transmission line 25 and conductors 40a and 40b, elements 21 and 23 and of conductors 51 and 53 are made such that at the point at which the driven elements 43, 45, 47 and 49 are coupled the driven element will most efficiently match the impedance of the connected transmission line. The four driven elements 43, 45, 47 and 49 are arranged to provide efficient reception over the 54 to 88 megacycles television frequency band. This frequency band is the low frequency end of the VHF television band and includes channels 2 through 6, inclusive. Driven dipole 43 is of a length to provide efficient reception at the high frequency end of this low band and driven dipole 49 is of a length to provide effective reception at the low frequency end of the low frequency VHF television band. The dipole units 45 and 47 are at intermediate lengths within this frequency band and by the proper adjustment of the lengths of these driven dipoles and the spacing between the driven dipoles by techniques well known in the state of the art, a relatively good low band operation with favorable gain, impedance match and directivity is provided at the 54 to 88 megacycle television band.

Good high VHF band performance at frequencies between 174 to 216 megacycles which covers channels 7 through 13 is obtained from the driven elements 45 and 47. This good high band performance in the VHF range is provided by placing relatively short parasitic elements 59 and 61 which each provide approximate half wave resonance for a signal within the high end of the VHF band in the vertical planes of these driven dipoles 45 and 47 at a relatively close spacing such as about 2 or 3 inches. These parasitic elements replace separate dipole driven elements at the high band but in practicing this invention dipole driven elements to cover the high VHF range of frequencies may be used. Mounting block 45a provides an insulated spacing between the parasitic elements 59 and the mounting bar 15 and driven element 45. The mounting block 47a provides an insulated mounting between the parasitic element 61 and the mounting bar 15 and the driven element 47. These parasitic elements 59 and 61 are believed to be in coupling relationship to their respective driven elements because of their location in substantially close parallel proximity to the driven element.

Reflector 63 further enhances response and directivity of the VHF antenna especially in the low VHF band since its space and its length is made approximately five per cent longer than the driven element 49 which is one-half of a wavelength long at the low end of the low VHF television frequency band and thereby acts inductive. The response and directivity of the antenna system is further enhanced by a parasitic director 65 which is mounted forward of driven element 43. The addition of more directors forward of the driven element would further increase response and directivity. The arms 65a and 65b of director 65 are coupled to insulating mounting bar 65c. The arms 65a and 65b are each made approximately equal, but slightly shorter than the length of the high band VHF parasitic elements to act as a capacitive reactive director for the high band VHF frequency. The overall director 65 acts by coupling arms 65a and 65b through the V-shaped coupler 66 coupled to the in-board arms of 65a and 65b as a similar director for the lower VHF television bands.

Mounted between folded dipole element 19 and parasitic director 65 and the shortest VHF dipole 43 is a corner sheet reflector 71 made up of a grid of parallel conductive rods 73, 75, 77, 79, 81 and 83 with a conductive supporting member 85 normal to and joining midpoints of the reflector conductor rods 73, 75 and 77 and with a conductive supporting member 87 normal to and joining the midpoints of reflector rods 79, 81 and 83. The conductive rods are riveted to the supporting members 85 and 87. Conductive mounting plates having channels therein are also riveted with the rods to the supporting members 85 and 87 so that the rods may be lodged in these channels to more securely hold these rods. The three conductive rods 73, 75 and 77 are in a coplanar aligned relationship and form with the electrically coupled supporting member the equivalent of a first flat infinite conductive sheet in a given plane. The conductor rods 79, 81 and 83 are in a coplanar aligned relationship and form with the supporting member 87 the equivalent of a second flat infinite conductive sheet in a second plane. Two support flanges 91a and 91b are riveted together and to the mounting bar 15 between folded dipole 19 and director 65 with a portion of the flanges extending above the plane formed by the folded dipole and the driven elements and with a portion of the flanges extending below the plane formed by the dipole and the other driven elements.

The support member 85 is riveted to the portion of the flanges 91*a* and 91*b* extending above the plane of the driven elements. The supporting member 87 is riveted to the portion of the flanges 91*a* and 91*b* extending below the plane driven elements. The supporting member 85 is mounted so that the first plane formed by the plurality of conductor rods 73, 75 and 77 makes a 45° angle with respect to the plane formed by the driven elements. The supporting member 87 is positioned so that the second plane formed by the conductive rods 79, 81 and 83 makes a 45° angle with respect to the plane formed by the driven elements and a 90° angle with respect to the first plane as shown in FIG. 1. The flange, the conductive rods and the supporting member in this embodiment are all made electrically conductive members and therefore the overall arrangement formed acts like an infinite plane corner sheet reflector to the folded dipole 19 forward of the corner of the reflector 71. It is not necessary that the corner reflector be a right or 90° corner reflector or that the flange and supporting members be conductive. The corner reflector may be for example a 60° corner reflector. Also the reflector may be a single flat sheet reflector. However, improved directivity is achieved by the use of a 90° or 60° corner reflector. The supporting members 85 and 87 are riveted to the flanges 91*a* and 91*b* so that the corner formed by the intersection of the planes is located aft of the folded dipole element 19 with the folded dipole along the bisector of the 90° angle as shown in FIG. 1.

The dimensions of the parallel conductive rods 73, 75, 77, 79, 81 and 83 including their length and the spacing of the folded dipole element from the corner of the reflector is made so that the corner reflector 71 acts as an infinite sheet corner reflector for the desired frequencies within UHF television band of frequencies. The dimensions of the rods with the support members 73, 75, 77, 79, 81 and 83 are also dimensioned and spaced from the driven elements 43, 45, 47 and 49 and parasitic elements 59 and 61 so as to act as directors for the high end of the VHF band of frequencies. The length of the rods 73, 75, 77, 79, 81 and 83 are therefore made as long as possible so as to approximate an infinite sheet for the UHF television band of frequencies and yet are made only sufficiently long enough so as to also act as directors for the high end of VHF television band of frequencies. This is contrary to the theory of single parasitic reflectors where the length of the reflector is made approximately the length of the driven dipole element. The length of the parallel conductive rods is made slightly shorter than one-half of a wavelength at the high frequency end of the VHF television band or for 216 megacycles about twenty and one-half inches. Due to their length and spacing from the parasitic elements, these conductive rods act as capacitive reactance directors at the high end of the television high frequency band.

In the operation of the antenna described above, UHF band signals within the desired television band of frequencies receive high gain with high directivity due to the use of the corner reflector 71 and the VHF signals receive additional gain and directivity at the high end of the VHF band due to the additional six director rods which make up the corner sheet reflector 71. Isolation between signals at the UHF folded dipole driven element and VHF driven elements is provided by conductors 33 and 35.

A television receiving antenna constructed in accordance with the present invention included the following dimensions:

Reflector rod 63 — overall length from tip to tip, 108 inches,
Driven dipole element 49 — overall length from outboard tip to outboard tip, 102 inches,
Driven dipole element 47 — overall length from outboard tip to outboard tip, 88 inches,
Parasitic element 61 — overall length from outboard tip to outboard tip, 27 ½ inches,
Driven dipole element 45 — overall length from outboard tip to outboard tip, 68 inches,
Parasitic element 59 — overall length from outboard tip to outboard tip, 27 inches,
Driven element 43 — overall length from outboard tip to outboard tip, 52 inches,
Parasitic director 65 — overall length from outboard tip to outboard tip, 52 inches,
Parasitic directors 16 and 17 — overall length between outboard tips 7 ¼ inches,
Parasitic directors 18 — overall length between outboard tips, 10 ¾ inches,
Driven folded dipole element 19 — overall length between coupled outboard tips, 12 ½ inches,
Director-reflector rods 73, 75, 77, 79, 81 and 83 each 20 ½ inches between outboard tips.

Distances along mounting bar 15 between the respective elements in the antenna described above are as follows:

Between reflector elements 63 and dipole element 49 — 16 ¼ inches,
Between dipole element 49 and element 47 — 10 ½ inches,
Between dipole element 47 and element 45 — 10 ½ inches,
Between dipole element 45 and element 43 — 10 ½ inches,
Between dipole element 43 and element 65 — 8 inches.

Distances along supporting members 85 and 87 between the respective elements in the sheet reflector described above are as follows:

Between rods 73 and 75, 4 15/16 inches,
Between rods 75 and 77, 3 7/8 inches,
Between rod 77 and bracket, 1 11/16 inches,
Between rod 79 and rod 81, 4 15/16 inches,
Between rods 81 and 83, 3 7/8 inches,
Between rod 83 and center of bracket, 2 11/16 inches.

The above dimensions and spacings are given only by way of example. The dimensions, spacings and other values actually used can be altered according to the needs of the particular application. Likewise, the number and form of the driven elements, directors and other elements of the antenna can be selected according to the needs of the particular application.

An antenna constructed in accordance with the above dimensions has been found to give good response over the entire VHF and UHF frequency range with particularly good response at the high end of the high frequency VHF television band and with particularly good response in the selected UHF band of frequencies.

While what has been shown and described is a specific embodiment of the present invention, it will, of course, be understood that various modifications and alternative constructions may be made without departing from its true spirit and scope. In particular there may be more parallel rods or a square reflective sheet or grid which forms the reflector 71. Also driven dipole elements of approximately one-half wavelength or multiples thereof long at the high end of the VHF television band may be used in place of the parasitics 59 and 61 or in addition to these parasitics. Also additional directors, reflectors and driven elements will provide improved directivity and response in accordance with well known state of the art techniques. What is claimed is:

1. A multi-frequency antenna for reception in both the television ultra high frequency band and the television very high frequency band comprising, in combination:
   - at least one center fed element being of sufficient length to provide effective operation as a pickup element within said ultra high frequency band;
   - a plurality of low band very high frequency center fed dipole elements of substantially coplanar aligned relation to each other and having progressively increasing lengths in the direction away from said one center fed element providing differing frequencies of most effective operation and coverage of the low band of said very high frequency television band;
   - one of said plurality of low band very high frequency center fed dipole elements associated with additional means forming a very high frequency multi-band antenna element substantially in parallel alignment with said one center fed element and said plurality of said low band dipole elements, said multi-band element comprising a plurality of closely spaced elongated conductors wherein only a first and second of said conductors form a fed dipole element halfwave resonant at a frequency within the low band of said very high frequency band;
   - said plurality of spaced elongated conductors being dimensioned and arranged to provide effective operation and coverage of frequencies within the low band and the high band of said very high frequency television frequency band;
   - feed means for connecting said one center fed element, said plurality of low band dipole elements, and said first and second conductors to terminals;
   - a grid-like element comprising a plurality of connected parallel conductive rods, said parallel conductive rods being substantially parallel to said one center fed element, said plurality of low band dipole elements and said multi-band element, said grid-like element being located between said one center fed element and said multi-band element with said parallel conductive rods spaced from each other and equally distributed above and below the plane defined by said plurality of low band dipole elements and said one center fed element, said parallel conductive rods each having a length approximately half a wavelength long for frequencies slightly above the highest frequency of said very high frequency band and being further dimensioned and arranged to act collectively as a sheet reflector for frequencies within said ultra high frequency band.

2. The combination as claimed in claim 1 wherein said parallel conductive rods are arranged so that a first plurality of these parallel conductive rods are located above said one plane defined by said plurality of low band dipole elements and said one center fed element and define a further plane that intersects said one plane at an angle of at most 45°, and a second plurality of parallel rods are located below said one plane and define a still further plane that intersects said one plane at said angle.

3. The combination as claimed in claim 1 wherein said multi-band antenna element includes two spaced and aligned conductive rods and a third parasitic element closely spaced to said aligned conductive rods.

* * * * *